US011347344B2

(12) United States Patent
Hattori

(10) Patent No.: US 11,347,344 B2
(45) Date of Patent: May 31, 2022

(54) ELECTRONIC DEVICE

(71) Applicant: KYOCERA Corporation, Kyoto (JP)

(72) Inventor: Shigeto Hattori, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/056,906

(22) PCT Filed: May 9, 2019

(86) PCT No.: PCT/JP2019/018525
§ 371 (c)(1),
(2) Date: Nov. 19, 2020

(87) PCT Pub. No.: WO2019/225330
PCT Pub. Date: Nov. 28, 2019

(65) Prior Publication Data
US 2021/0294450 A1 Sep. 23, 2021

(30) Foreign Application Priority Data
May 22, 2018 (JP) .............................. JP2018-097990

(51) Int. Cl.
*G06F 3/041* (2006.01)
*G06F 3/01* (2006.01)
*G06F 3/043* (2006.01)
*G06F 3/04883* (2022.01)

(52) U.S. Cl.
CPC ............ *G06F 3/0416* (2013.01); *G06F 3/016* (2013.01); *G06F 3/043* (2013.01); *G06F 3/04883* (2013.01); *G06F 2203/04108* (2013.01)

(58) Field of Classification Search
CPC ........ G06F 3/0416; G06F 3/043; G06F 3/016; G06F 3/04883; G06F 2203/04108; G06F 1/1643; G06F 3/0433; G06F 3/041
See application file for complete search history.

(56) References Cited

U.S. PATENT DOCUMENTS

| | | |
|---|---|---|
| 8,179,378 B2 | 5/2012 | Aono |
| 8,830,187 B2 | 9/2014 | Aono |
| 9,348,442 B2 | 5/2016 | Kitatani et al. |
| 2010/0141410 A1* | 6/2010 | Aono ...................... G06F 3/016 340/407.2 |
| 2011/0163984 A1 | 7/2011 | Aono |
| 2011/0169758 A1 | 7/2011 | Aono |
| 2012/0194483 A1* | 8/2012 | Deluca .................. G06F 1/1643 345/177 |

(Continued)

FOREIGN PATENT DOCUMENTS

| | | |
|---|---|---|
| JP | 4633183 B1 | 2/2011 |
| JP | 2012-155526 A | 8/2012 |
| JP | 2018-018288 A | 2/2018 |

*Primary Examiner* — Stephen T. Reed
(74) *Attorney, Agent, or Firm* — Studebaker & Brackett PC

(57) ABSTRACT

An electronic device includes a touch portion, a piezoelectric element, and a receiver configured to receive an ultrasonic wave. The electronic device is configured to drive the piezoelectric element in a first drive mode to provide a tactile sensation to an object in contact with the touch portion. The electronic device is configured to drive the piezoelectric element in a second drive mode to transmit an ultrasonic wave, and receive, by the receiver, a reflected wave of the transmitted ultrasonic wave to detect an object.

4 Claims, 5 Drawing Sheets

(56) References Cited

U.S. PATENT DOCUMENTS

| | | | |
|---|---|---|---|
| 2013/0142362 A1* | 6/2013 | Lynn | G06F 3/0433 381/109 |
| 2013/0285967 A1 | 10/2013 | Kitatani et al. | |
| 2014/0092037 A1* | 4/2014 | Kim | G06F 3/041 345/173 |
| 2018/0032140 A1 | 2/2018 | Tanabe et al. | |

* cited by examiner

ELECTRONIC DEVICE

CROSS REFERENCE TO RELATED APPLICATION

This application claims priority to Japanese Patent Application No. 2018-097990 filed on May 22, 2018, the entire disclosure of which is incorporated herein by reference.

TECHNICAL FIELD

The present disclosure relates to an electronic device.

BACKGROUND

An electronic device having a tactile sensation providing function of providing a realistic tactile sensation to an object in contact such as a finger on a touch panel using a piezoelectric element is known.

SUMMARY

An electronic device according to an embodiment of the present disclosure includes a touch portion, a piezoelectric element, and a receiver configured to receive ultrasonic waves. The electronic device is configured to drive the piezoelectric element in a first drive mode to provide a tactile sensation to an object in contact with the touch portion. The electronic device is configured to drive the piezoelectric element in a second drive mode to transmit an ultrasonic wave, and receive, by the receiver, a reflected wave of the transmitted ultrasonic wave to detect an object.

DETAILED DESCRIPTION

There is demand to add, to electronic devices having a tactile sensation providing function, a contactless detection function of contactlessly detecting whether an object is present or an air gesture (hereafter also simply referred to as "gesture"), in order to support various applications. In this case, if a component for the tactile sensation providing function and a component for the contactless detection function are separately provided, the number of parts increases.

The present disclosure relates to providing an electronic device that can have a tactile sensation providing function and a contactless detection function with a reduced number of parts.

An electronic device according to one of the disclosed embodiments can have a tactile sensation providing function and a contactless detection function with a reduced number of parts.

One of the disclosed embodiments will be described below, with reference to the drawings.

Figure 1:
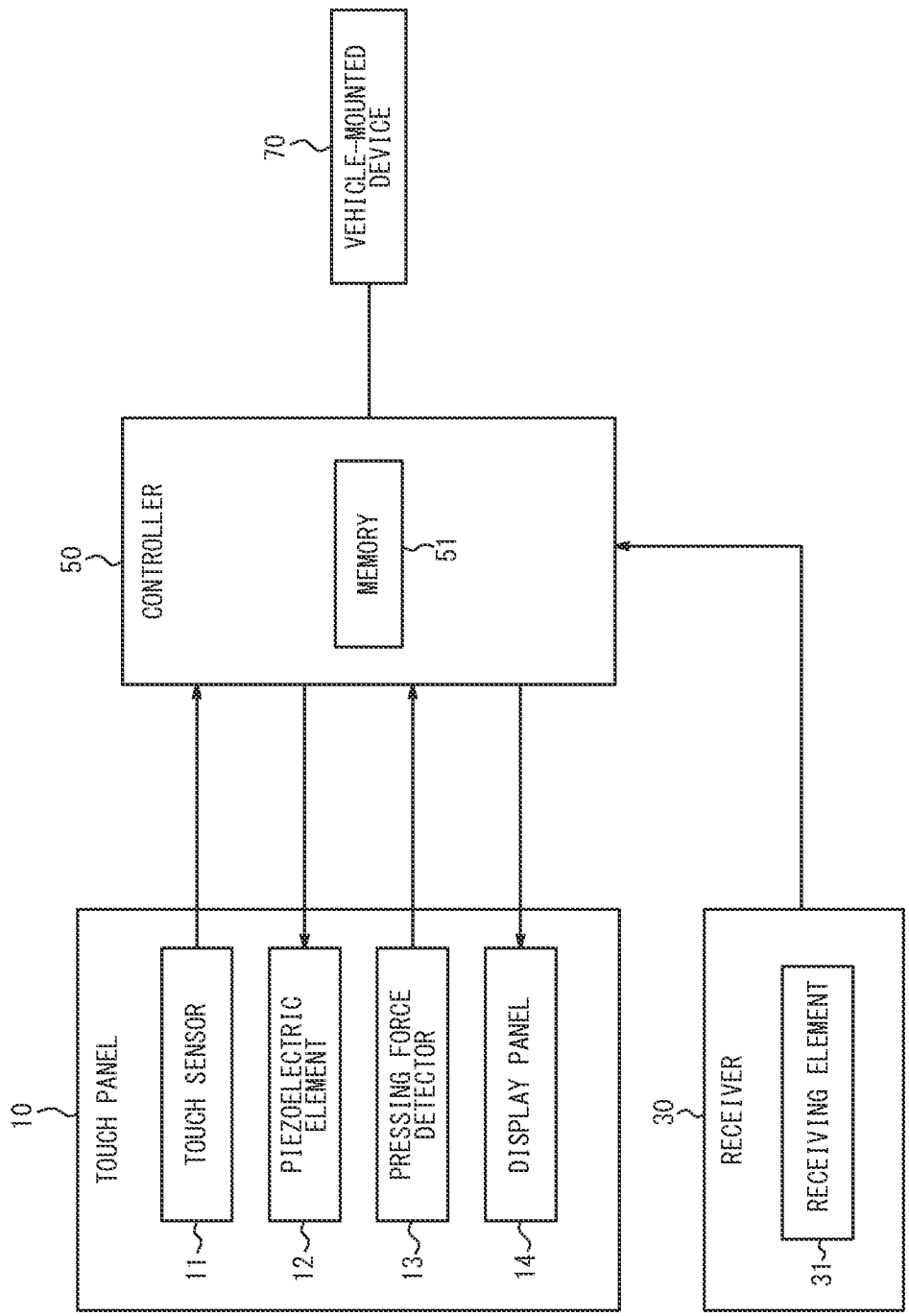
FIG. 1 is a functional block diagram illustrating a schematic structure of an electronic device according to one of the disclosed embodiments.

FIG. 1 is a functional block diagram illustrating a schematic structure of an electronic device according to one of the disclosed embodiments. The electronic device according to one of the disclosed embodiments is configured to be mounted in a vehicle, and includes a touch panel 10, an ultrasonic receiver 30, and a controller 50. The touch panel 10 includes a touch sensor 11, a piezoelectric element 12, a pressing force detector 13, and a display panel 14.

The controller 50 is connected to each of the touch sensor 11, the piezoelectric element 12, the pressing force detector 13, and the display panel 14. The controller 50 transmits a signal or information associated with the signal (hereafter also referred to as "control information") to each part connected thereto, or acquires control information from each part connected thereto. In FIG. 1, the arrow connecting the controller 50 and each part indicates a main direction in which control information is output.

The controller 50 includes a memory 51. The memory 51 stores various information, programs for operating the controller 50, and the like. The memory 51 also functions as working memory. Although the memory 51 is included in the controller 50 in FIG. 1, an external storage device such as a hard disk may be connected to the controller 50.

The controller 50 stores control information in the memory 51. The controller 50 also acquires control information from the memory 51. The controller 50 controls each part connected thereto, according to control information. Control operations performed by the controller 50 will be described later.

The controller 50 is connected to a controlled device mounted in the vehicle (hereafter also collectively referred to as "vehicle-mounted device 70"). The controller 50 outputs control information for operating the vehicle-mounted device 70 (hereafter also referred to as "device operation information"), according to input to the touch sensor 11. The controller 50 also acquires control information indicating the state of the vehicle-mounted device 70.

The controller 50 also executes an application for operating the vehicle-mounted device 70 (hereafter also simply referred to as "application"), in order to operate the vehicle-mounted device 70. The controller 50 generates device operation information, according to input of an operator (e.g. a driver) to the application. The controller 50 then outputs the device operation information to the vehicle-mounted device 70.

The vehicle-mounted device 70 operates based on the device operation information acquired from the controller 50. The vehicle-mounted device 70 operated by the application may include various devices. Examples of the vehicle-mounted device 70 include a car navigation system, an air conditioner, an audio device, a television, and a communication device.

The touch sensor 11 constitutes a touch portion. The touch sensor 11 detects a touch of an object (object in contact) such as a finger or a stylus on the touch sensor 11. The following description assumes that a finger touches the touch sensor 11, although the same applies to the case where other objects such as a stylus touch the touch sensor 11. The touch sensor 11 may use any touch detection method such as capacitive, resistive, surface acoustic wave (or ultrasonic wave), infrared, electromagnetic induction, or load sensing.

In the case where the touch sensor 11 detects a touch of a finger, the touch sensor 11 acquires the coordinates of the position of the touch, and outputs the coordinates to the controller 50 as control information. The operator can, by touching the touch sensor 11 with a finger, perform input corresponding to the touch position.

The piezoelectric element 12 generates vibration in any of various patterns according to a drive signal acquired from the controller 50, to provide a tactile sensation to the operator's finger touching the touch sensor 11. For example, the piezoelectric element 12 generates vibration in a vibration pattern corresponding to click feeling, material texture, or the like, to provide a tactile sensation of click feeling, material texture, or the like to the operator's finger touching the touch sensor 11.

The piezoelectric element 12 also generates vibration according to a drive signal acquired from the controller 50, to transmit (emit) an ultrasonic wave. The ultrasonic wave may be transmitted from the piezoelectric element 12 directly to a space in front of the touch panel 10 or transmitted from the piezoelectric element 12 to the space in front of the touch panel 10 through the touch sensor 11, depending on the structure of the touch panel 10. In the following description, these cases are collectively regarded as transmission of an ultrasonic wave from the touch panel 10.

In the case of providing a tactile sensation to the operator's finger touching the touch sensor 11, the controller 50 outputs, as control information, a drive signal of a first drive mode to the piezoelectric element 12 to drive the piezoelectric element 12. In the case of causing the piezoelectric element 12 to transmit an ultrasonic wave, the controller 50 outputs, as control information, a drive signal of a second drive mode to the piezoelectric element 12 to drive the piezoelectric element 12.

The vibration frequency of the piezoelectric element 12 in the first drive mode is, for example, about several hundred Hz. In the first drive mode, the frequency, amplitude, period, etc. of the drive signal are controlled as appropriate to cause the piezoelectric element 12 to vibrate in a vibration pattern corresponding to a tactile sensation to be provided. The vibration frequency of the piezoelectric element 12 in the second drive mode is, for example, 20 kHz or more. In the second drive mode, for example, the piezoelectric element 12 is caused to intermittently vibrate in a predetermined period to transmit an ultrasonic wave in pulse form.

The pressing force detector 13 detects a pressure (pressing force) generated as a result of the operator touching the touch sensor 11 with a finger, a stylus, or the like and further pressing the touch sensor 11. Data based on the pressing force detected by the pressing force detector 13 is output to the controller 50 as control information.

The pressing force detector 13 may include, for example, a strain gauge sensor or a piezoelectric element that changes in physical or electrical characteristics (strain, resistance, voltage, etc.) depending on the pressing force. For example, in the case where the pressing force detector 13 includes a piezoelectric element, the foregoing piezoelectric element 12 that provides a tactile sensation and transmits an ultrasonic wave may be shared. This is possible because a piezoelectric element generates a voltage when a pressure is applied, and is deformed when a voltage is applied. In this case, the piezoelectric element 12 changes in voltage value (data based on the pressing force) as electrical characteristics, depending on the magnitude of the load by the pressing force on the touch sensor 11. The data based on the pressing force is not limited to the voltage value, and may be the magnitude of the load by the pressing force, the resistance value, or the like.

The pressing force detector 13 may be configured depending on the detection method of the touch sensor 11. For example, in the case where the detection method of the touch sensor 11 is resistive, the resistance corresponding to the contact area may be associated with the load of the pressing force on the touch sensor 11. In the case where the detection method of the touch sensor 11 is capacitive, the capacitance may be associated with the load of the pressing force on the touch sensor 11. This makes it possible to implement the pressing force detector 13 by the touch sensor 11 without using a strain gauge sensor, a piezoelectric element, or the like.

In the case where the data based on the pressing force acquired from the pressing force detector 13 is not less than a predetermined threshold (i.e. in the case where the pressing force is not less than a predetermined pressure), the controller 50 confirms input of an operation object at the position of the touch. The controller 50 also drives the piezoelectric element 12 in the first drive mode, to provide the tactile sensation corresponding to the operation object to the operator.

The display panel 14 displays text, images, operation objects, etc. visible to the operator, based on control information acquired from the controller 50. The display panel 14 includes a liquid crystal display (LCD), an organic or inorganic EL display, or the like.

The receiver 30 receives an ultrasonic wave and converts the ultrasonic wave into an electrical signal. The receiver 30 includes one or more receiving elements 31. The receiving elements 31 may use, for example, SPM0404UD5 produced by Knowles Corporation.

The receiver 30 outputs the electrical signal to the controller 50. The controller 50 filters the electrical signal from the receiver 30 to obtain a reception signal in a band corresponding to a frequency of an ultrasonic wave transmitted by the piezoelectric element 12. The controller 50 then, for example, detects contactless operation by the operator corresponding to the application and generates device operation information, based on the transmission timing of the ultrasonic wave from the piezoelectric element 12 and the reception timing of the corresponding ultrasonic wave by the receiver 30. The controller 50 outputs the device operation information to the vehicle-mounted device 70 to be controlled.

The controller 50 is, for example, a processor that controls and manages the overall vehicle. The controller 50 includes a processor such as a central processing unit (CPU) that executes a program defining a control procedure. For example, the program is stored in the memory 51 or the like. Specifically, in the vehicle, the controller 50 includes an electric control unit or an engine control unit (ECU). The ECU controls the vehicle. That is, the ECU controls the vehicle-mounted device 70 used in relation to the vehicle. The controller 50 may be, for example, composed of one ECU, or composed of a main ECU for controlling the overall vehicle and a plurality of sub ECUs each for controlling part of the vehicle-mounted devices 70. The controller 50 may be wholly or partially included in the touch panel 10.

Figure 2:
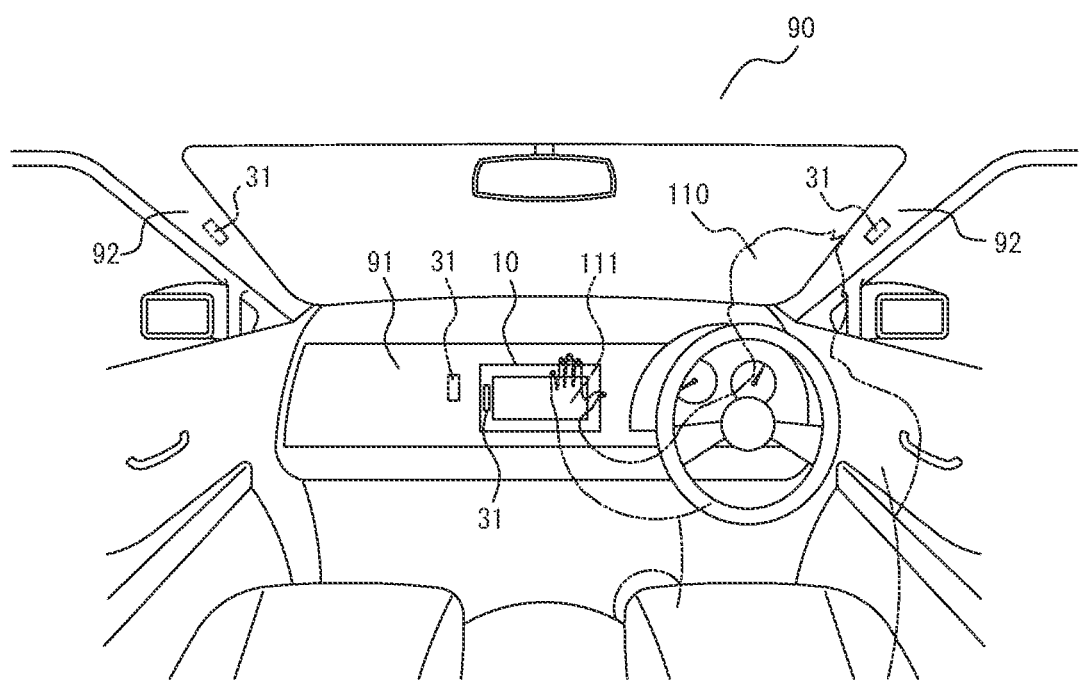
FIG. 2 is a diagram illustrating an example of arrangement of a touch panel and a receiver in FIG. 1 in a vehicle.

FIG. 2 is a diagram illustrating an example of arrangement of the touch panel 10 and the receiver 30 illustrated in FIG. 1 in a vehicle 90. In the case where the operator is a driver 110, the touch panel 10 is located in a center part of a dashboard 91 of the vehicle 90, to minimize the possibility that the driver 110 looks away from the front of the vehicle 90 while driving the vehicle 90. When the piezoelectric element 12 illustrated in FIG. 1 is driven in the second drive mode, an ultrasonic wave is transmitted from the touch panel 10 rearward in the vehicle.

Each receiving element 31 included in the receiver 30 is located at any position in which, in the case where the operator holds an operation object 111 such as a hand or a finger in front of the touch panel 10, an ultrasonic wave reflected by the operation object 111 can be received. For example, in the case where the receiver 30 is composed of one receiving element 31, the receiving element 31 is located in the housing of the touch panel 10, the dashboard 91, an A-pillar 92, or the like. In the case where the receiver 30 is composed of a plurality of receiving elements 31, the receiving elements 31 are located in the same member or different members from among the housing of the touch panel 10, the dashboard 91, the A-pillar 92, and the like.

Figure 3:
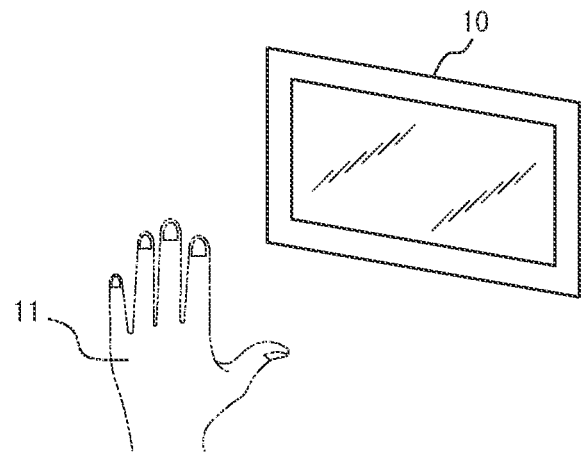
FIG. 3 is a diagram illustrating an example in which an operator holds an operation object in front of the touch panel.

In the case where the receiver 30 is composed of one receiving element 31, the controller 50 (see FIG. 1) can detect whether the operator holds the operation object 111 in front of the touch panel 10, based on the presence or absence of the corresponding ultrasonic wave reception signal in the receiving element 31. For example, in the case where the operation object 111 is held in a region of a predetermined range in front of the touch panel 10 as illustrated in FIG. 3, within a predetermined time from the transmission timing of an ultrasonic wave, a reflected wave of the ultrasonic wave reflected by the operation object 111 is received by the receiving element 31. Thus, for example, the controller 50 can switch applications or control ON/OFF of the corresponding application, based on an output signal from the receiving element 31.

Figure 4:
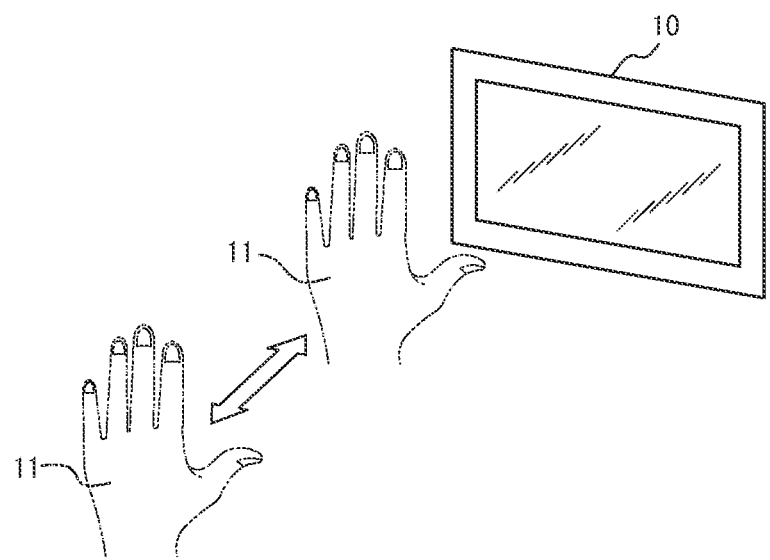
FIG. 4 is a diagram illustrating a gesture, made to the touch panel, of the operation object moving in the front-back direction of the vehicle.
Figure 5:
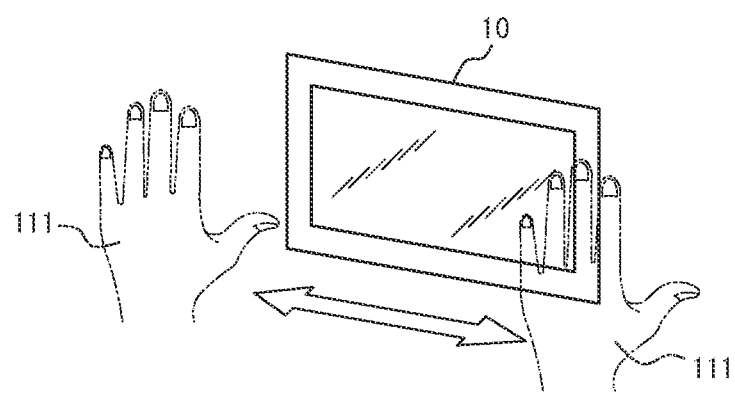
FIG. 5 is a diagram illustrating a gesture, made to the touch panel, of the operation object linearly moving in a direction intersecting with the front-back direction of the vehicle.

For example, in the case where a gesture of the operation object 111 moving in the front-back direction of the vehicle 90 is made to the touch panel 10 as illustrated in FIG. 4, the distance between the operation object 111 and the receiving element 31 changes with time. Likewise, in the case where a gesture of the operation object 111 linearly moving in any direction intersecting with the front-back direction of the vehicle 90, e.g. the width direction of the vehicle 90 as illustrated in FIG. 5, is made to the touch panel 10, the distance between the operation object 111 and the receiving element 31 changes with time.

In such cases, with the temporal change of the distance between the operation object 111 and the receiving element 31, the time difference between the transmission timing of the ultrasonic wave periodically transmitted from the touch panel 10 and the reception timing of the reflected wave of the corresponding ultrasonic wave, which has been reflected by the operation object 111, received by the receiving element 31 changes. Accordingly, the controller 50 can detect the gesture of the operation object 111 based on the change of the time difference between the transmission timing and the reception timing of the ultrasonic wave. The controller 50 can thus control the vehicle-mounted device 70 based on the detected gesture.

For example, in the case where the time difference between the transmission timing and the reception timing of the ultrasonic wave increases gradually, the controller 50 can perform control of the vehicle-mounted device 70 corresponding to the application, such as increasing the display magnification of a map displayed on the navigation system, increasing the sound volume of the audio device, or increasing the temperature or air volume of the air conditioner. In the case where the time difference between the transmission timing and the reception timing of the ultrasonic wave decreases gradually, the controller 50 can perform control of the vehicle-mounted device 70 corresponding to the application, such as decreasing the display magnification of the map, decreasing the sound volume of the audio device, or decreasing the temperature or air volume of the air conditioner.

Figure 6:
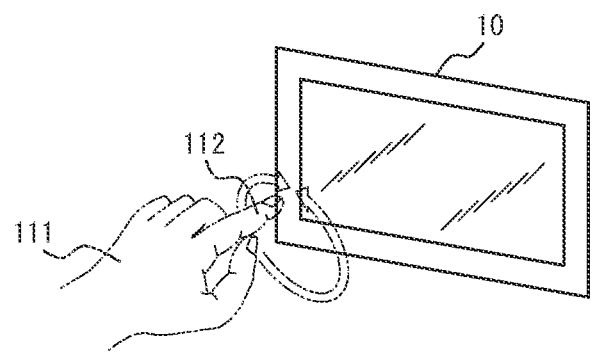
FIG. 6 is a diagram illustrating a gesture, made to the touch panel, of the operation object drawing a circle.

In the case where the receiver 30 is composed of a plurality of receiving elements 31, in addition to the foregoing control in the case where the receiver 30 is composed of one receiving element 31, the controller 50 (see FIG. 1) can easily detect a gesture of more complex movement. For example, in the case where a gesture of the operation object 111 drawing a circle with the tip of one finger 112 is made to the touch panel 10 as illustrated in FIG. 6, the distance between the tip of the finger 112 and each receiving element 31 changes depending on the gesture. The pattern of the change of the distance differs between the receiving elements 31, and also differs between a gesture of drawing a circle clockwise and a gesture of drawing a circle counterclockwise.

Accordingly, the controller 50 can detect the gesture of the operation object 111 based on, for example, the pattern of change in ultrasonic wave reception timing in each receiving element 31. The controller 50 can thus control the vehicle-mounted device 70 based on the detected gesture. For example, in the case where the controller 50 detects the gesture of drawing a circle clockwise, the controller 50 can perform control of the vehicle-mounted device 70 corresponding to the application, such as increasing the display magnification of the map, increasing the sound volume of the audio device, or increasing the temperature or air volume of the air conditioner. In the case where the controller 50 detects the gesture of drawing a circle counterclockwise, the controller 50 can perform control of the vehicle-mounted device 70 corresponding to the application, such as decreasing the display magnification of the map, decreasing the sound volume of the audio device, or decreasing the temperature or air volume of the air conditioner.

The clockwise gesture and the counterclockwise gesture can be detected in the case where the receiver 30 is composed of one receiving element 31, too. In this case, the receiving element 31 is installed at an appropriate position so that the pattern of change in ultrasonic wave reception timing in the receiving element 31 differs between the clockwise gesture and the counterclockwise gesture.

Figure 7:
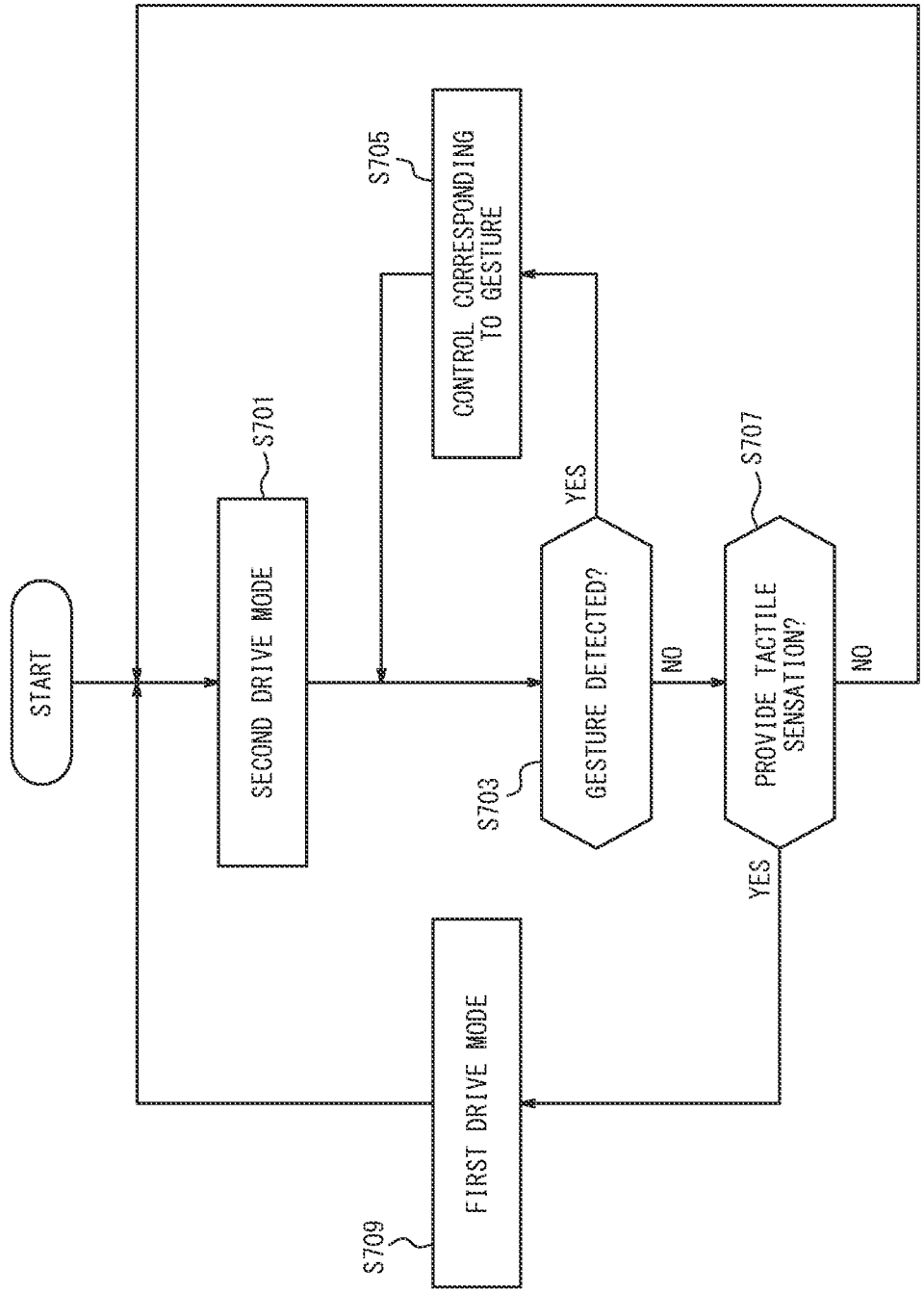
FIG. 7 is a flowchart schematically illustrating an example of operations of the electronic device in FIG. 1.

FIG. 7 is a flowchart schematically illustrating an example of operations of the electronic device according to this embodiment. In FIG. 7, detection of whether the operation object 111 is present by an ultrasonic wave is also regarded as detection of a gesture. The operations will be described below, with reference to FIG. 1.

In the flowchart in FIG. 7, when the electronic device is started, the controller 50 drives the piezoelectric element 12 in the second drive mode (step S701). The controller 50 thus causes the piezoelectric element 12 to, for example, intermittently vibrate in a predetermined period to transmit an ultrasonic wave in pulse form.

Having started driving the piezoelectric element 12 in the second drive mode, the controller 50 detects a gesture based on output of the receiver 30 (step S703). In the case where a gesture is detected (step S703: Yes), the controller 50 controls the vehicle-mounted device 70 according to the detected gesture as described above (step S705). After this, the controller 50 returns to the process in step S703 to detect a gesture.

In the case where a gesture is not detected in step S703 (step S703: No), the controller 50 determines whether to provide a tactile sensation based on output of the touch sensor 11, the pressing force detector 13, or the like in the touch panel 10 (step S707). In the case where the controller 50 determines to provide a tactile sensation (step S707: Yes), the controller 50 drives the piezoelectric element 12 in the first drive mode (step S709). The controller 50 thus causes the piezoelectric element 12 to vibrate in a vibration pattern corresponding to an operation object at a touch position on the touch sensor 11, to provide a tactile sensation to the operator.

After this, the controller 50 returns to the process in step S701 to drive the piezoelectric element 12 in the second drive mode. In the case where the controller 50 determines not to provide a tactile sensation in step S707 (step S707: No), the controller 50 returns to the process in step S701 to continue driving the piezoelectric element 12 in the second drive mode.

In step S709, the controller 50 can drive the piezoelectric element 12 in the first drive mode, in any of the following drive states. In a first drive state, the controller 50 drives the piezoelectric element 12 in the first drive mode in a state of stopping driving the piezoelectric element 12 in the second drive mode. That is, the controller 50 switches the piezoelectric element 12 from the second drive mode to the first drive mode.

In this case, for example, the controller 50 stops the second drive mode, in synchronization with the timing when the controller 50 detects, based on the output of the touch sensor 11, that the operator is in contact with the touch sensor 11 in step S707. Subsequently, the controller 50 drives the piezoelectric element 12 in the first drive mode, in synchronization with the timing when the output of the pressing force detector 13 reaches the predetermined threshold or more. After the driving in the first drive mode ends, the controller 50 returns to the process in step S701 to drive the piezoelectric element 12 in the second drive mode.

In a second drive state, the controller 50 drives the piezoelectric element 12 in the first drive mode while driving the piezoelectric element 12 in the second drive mode. That is, the controller 50 drives the piezoelectric element 12 in a state in which the first drive mode is superimposed on the second drive mode. In this case, depending on the drive timing of the piezoelectric element 12 in the first drive mode, the piezoelectric element 12 may be driven in such a way that the drive signal in the first drive mode overlaps wholly or partially with the drive signal in the pulse period for transmitting the ultrasonic wave in the second drive mode.

As described above, in the electronic device according to one of the disclosed embodiments, the piezoelectric element for providing a tactile sensation is also used to transmit an ultrasonic wave. Therefore, the electronic device can have the tactile sensation providing function and the contactless detection function with a reduced number of parts.

While some embodiments of the present disclosure have been described above by way of drawings, various changes or modifications may be easily made by those of ordinary skill in the art based on the present disclosure. Such various changes or modifications are therefore included in the scope of the present disclosure. For example, the functions included in the functional units, etc. may be rearranged without logical inconsistency, and a plurality of functional units, etc. may be combined into one functional unit, etc. and a functional unit, etc. may be divided into a plurality of functional units, etc. Moreover, each of the disclosed embodiments is not limited to the strict implementation of the embodiment, and features may be combined or partially omitted as appropriate.

For example, although the foregoing embodiment describes the case where the touch panel 10 is located in the center part of the dashboard 91 of the vehicle 90, the touch panel 10 may be, for example, a control pad located in a center console of the vehicle 90. In this case, the display panel 14 may be omitted. The touch panel 10 may be, for example, various switches located in the center console, steering wheel, door, or the like of the vehicle 90. In this case, too, the display panel 14 may be omitted. In the case of switches, the touch portion may be a member having no sensor function, instead of the touch sensor 11. In such a case, the controller 50 may detect contact with the touch panel 10 based on output of the pressing force detector 13.

Although the piezoelectric element 12 is driven in the second drive mode upon the start of the electronic device in the flowchart in FIG. 7, for example, the piezoelectric element 12 may be selectively driven in the first drive mode and the second drive mode according to operation of a mode selection switch. In detail, in a state in which the first drive mode is selected, the controller 50 enables the tactile sensation providing function and disables the contactless detection function such as gesture detection, to drive the piezoelectric element 12 in the first drive mode only in the case of providing a tactile sensation without driving the piezoelectric element 12 in the second drive mode. In a state in which the second drive mode is selected, the controller 50 enables the contactless detection function and disables the tactile sensation providing function, to drive the piezoelectric element 12 only in the second drive mode and detect a gesture and the like without driving the piezoelectric element 12 in the first drive mode. The mode selection switch may be provided, for example, at any easy-to-operate position such as the touch panel 10, the center console, or the steering wheel.

The electronic device according to the present disclosure is not limited to a device mounted in a vehicle, and may be any of various electronic devices such as a mobile phone, a smartphone, a tablet personal computer (PC), a laptop PC, a desktop PC, a household appliance, an industrial device (factory automation (FA) device), and a dedicated terminal. In such cases, too, the display panel 14 may be omitted or the touch portion may be a member having no sensor function, depending on the type of the electronic device.

The invention claimed is:

1. An electronic device, comprising:
    a touch portion;
    a piezoelectric element having a first drive mode and a second drive mode, the piezoelectric element providing a tactile sensation to an object in contact with the touch portion in the first drive mode, and transmitting an ultrasonic wave in the second drive mode; and
    a receiver configured to receive a reflected wave of the transmitted ultrasonic wave to detect the object, wherein
    the electronic device is configured to drive the piezoelectric element in the first drive mode to provide the tactile sensation to the object in contact with the touch portion, while driving the piezoelectric element in the second drive mode, and
    the piezoelectric element is driven in the first drive mode and the second drive mode at the same time using overlapping drive signals.

2. The electronic device according to claim 1, wherein the receiver includes a plurality of receiving elements.

3. The electronic device according to claim 1, wherein the electronic device is configured to detect a gesture of the object based on output of the receiver.

4. The electronic device according to claim 2, wherein the electronic device is configured to detect a gesture of the object based on output of the receiver.

\* \* \* \* \*